United States Patent [19]

Siol et al.

[11] 4,456,726

[45] Jun. 26, 1984

[54] METHOD FOR MAKING AQUEOUS DISPERSIONS OF A SYNTHETIC RESIN

[75] Inventors: Werner Siol, Darmstadt; Herbert Fink, Bickenbach; Wolfgang Klesse, Mainz; Hubert Rauch, Weiterstadt; Norbert Suetterlin, Ober-Ramstadt, all of Fed. Rep. of Germany

[73] Assignee: Röhm GmbH, Darmstadt, Fed. Rep. of Germany

[21] Appl. No.: 434,825

[22] Filed: Oct. 18, 1982

[30] Foreign Application Priority Data

Nov. 27, 1981 [DE] Fed. Rep. of Germany ....... 3147008

[51] Int. Cl.$^3$ .............................................. C08F 2/16
[52] U.S. Cl. ..................................... 524/501; 524/458
[58] Field of Search ............................... 524/501, 458

[56] References Cited

U.S. PATENT DOCUMENTS 4,245,070 1/1981 Kemp ..................................... 526/75
4,247,438 1/1981 Eck et al. ........................... 260/26.9
4,254,004 3/1981 Abbey ................................. 523/221
4,322,330 3/1982 Merz et al. ......................... 523/221

Primary Examiner—Paul R. Michl
Assistant Examiner—Alex H. Walker
Attorney, Agent, or Firm—Curtis, Morris & Safford

[57] ABSTRACT

What is disclosed is making highly concentrated, bimodal, aqueous synthetic resin dispersions by the emulsion polymerization of ethylenically unsaturated monomers, in the presence of emulsifiers and free radical-forming initiators, by adding to a first latex containing a first dispersed synthetic resin and an aqueous phase, a second latex containing a second dispersed synthetic resin and an aqueous phase and a monomer phase containing a free-radically polymerizable monomer, and then polymerizing the monomer, the average size of the particles of said first resin differing by a factor between 2 and 15 from that of the particles of second resin, the total weight of the resins and monomers representing 100 parts by weight, and the total weight of the aqueous phases representing not more than 70 parts by weight.

8 Claims, No Drawings

METHOD FOR MAKING AQUEOUS DISPERSIONS OF A SYNTHETIC RESIN

The present invention relates to a method for making aqueous dispersions of a synthetic resin.

Highly concentrated synthetic resin dispersions are of considerable interest whereever such a resin is to be used as a binder, adhesive, coating or the like in a noncombustible liquid formulation that should dry as readily as possible. In the conventional resin dispersions containing from 50 to 60 percent solids, from 100 to 66 parts of water must be evaporated for each 100 parts of resin. It is possible to prepare dispersions having a still lower water content, but these are highly viscous and dilatant because of the tendency of the dispersed particles to form crystal-like ordered states. Biomodal dispersions do not have this drawback. Bimodal dispersions are dispersions whose particles are of different sizes, with at least two distinct maxima in the particle size distribution curve. With equal solids content, they are less viscous and lack structural viscosity.

According to German patent application DOS No. 29 31 127, bimodal dispersions can be prepared by mixing dispersions having different average particle sizes. The highly concentrated dispersions must be prepared separately, which is difficult because of the viscosity problems alluded to above.

Another approach is to add, in the second stage of a two-stage emulsion polymerization process, an additional amount of emulsifying agent sufficient for the formation of new particles whose growth does not proceed to reach the state of the particles originally formed and which form a second maximum in the distribution curve. The processes of German patent applications DOS NO. 28 37 992 and 29 31 127 and of U.S. Pat. NO. 4,254,004 are based on this principle. However, it is difficult to obtain reproducible results with these processes because the properties of the dispersion depend markedly on the number of particles formed in the second stage. That number depends, in a manner that is difficult to determine, on a number of factors.

According to French Patent No. 2,344,579, a "microsuspension" of polyvinyl chloride particles exhibiting more than two particle-size maxima is obtained by mixing a previously prepared "microsuspension" with two further previously prepared "microsuspensions" or dispersions, at least one of which contains an organically soluble initiator incorporated in its particles, and by adding more monomer in the absence of further initiators. The particles containing the initiator then continue to grow until the desired high solids content is reached, while the size of the particles free of initiator remains the same. The preparation of initiator-containing "microsuspensions" differs from conventional emulsion polymerization and its products, for which reason they can be used as a substitute for aqueous plastic dispersions only in exceptional cases.

The present invention has as its object to provide for the preparation of aqueous bimodal resin dispersions with constant properties in a reproducible manner by a process which permits the preparation of highly concentrated resin dispersions having a solids content of from 60 to 70 weight percent, for example. This object is accomplished according to the present invention using a mixture of two dispersions having different average particle sizes and the solids contents of which may be in the range in which the special problems associated with highly concentrated monodisperse latices are not encountered, for example, under 55 weight percent. The ratio of the average particle sizes and the proportions of the different latex particles can be fixed precisely and reproducibly in mixing the previously prepared dispersions so that, during further growth in the course of polymerization, dispersions with precisely predetermined properties are obtained. It thus becomes possible to prepare dispersions with synthetic resin contents ranging from 60 to 70 weight percent and even higher, and of relatively low viscosity, which have outstanding properties for technical uses.

The dispersions prepared in accordance with the invention contain a first synthetic resin A and a second synthetic resin B from the previously prepared latices and a third synthetic resin formed by polymerization of monomers C. These resins may be identical or different, depending on whether latex particles having a homogeneous structure or a shell-like structure or latex particles having different properties are desired in the end product. The previously prepared latex resins A and B may also be of shell-like structure. The monomers C, in turn, may be a plurality of monomers or mixtures of monomers to be used successively. Preferably at least the resin A and the monomer C comprise the same monomer or mixture of monomers. The process of the invention is not limited to a given composition of components A, B and C, provided that the requirement generally applicable to aqueous resin dispersions is met, namely, that the resins A and B and the resin formed by the polymerization of C be water-insoluble at least under the conditions of preparation and use. This will be the case when at least a sufficiently large portion of the monomers on which the resins are comprised is water-insoluble or only sparingly water-soluble.

The monomers on which the components A, B and C may be based include, for example, the alkyl esters of acrylic acid and of methacrylic acid having from 1 to 14 carbon atoms in the alkyl group, styrene and its homologs, vinyl esters of lower carboxylic acids, dienes, and lower alpha-olefins. These generally are the principal monomers which make up more than 50 weight percent of the resins. Suitable modifying monomers, which as a rule make up less than 50 percent of the resin, are acrylonitrile and methacrylonitrile, acrylamide and methacrylamide, their N-methylol compounds and N-methylol ethers, hydroxyalkyl esters of acrylic acid and of methacrylic acid, optionally quaternized aminoalkyl esters and aminoalkyl amides of acrylic acid and of methacrylic acid, unsaturated carboxylic acids such as acrylic acid and methacrylic acid, maleic, fumaric, and itaconic acid and the half-esters of these dibasic carboxylic acids, as well as maleic anhydride.

A preferred class of resins is formed predominantly (that is, to the extent of 70 percent or more) from alkyl acrylates or alkyl methacrylates, or from mixtures of these and styrene. These resins preferably contain a small amount of an $\alpha, \beta$-unsaturated carboxylic acid.

The aqueous phase in the finished dispersion represents not more than 70 parts by weight per 100 parts by weight of the dispersed solid (which corresponds with a resin content above 58 weight percent) and is preferably not more than 65 parts by weight. Particularly preferred is the preparation of highly concentrated dispersions containing from 40 to 60 weight percent of water per 100 parts by weight of resin, which corresponds with a resin content of about 62 to 70 weight percent. Further reduction of the amount of the water phase is possible in many cases when due care is exercised in preparation. However, it should not be overlooked that with decreasing water content a theoretical limiting value is approached which in the case of strictly monodisperse dispersions is 26 volume percent and in the case of bimodal dispersions is even somewhat lower. At that limiting value the resin particles are in contact with one another so that a system capable of flowing freely is no longer present. The invention makes it possible to approach that limiting value, although the sensitivity to coagulating influences then increases steadily.

In the process of the invention, the aqueous phase of the dispersion is composed of the aqueous phase of the first latex, which is charged first, and of the aqueous phase of the second latex, which is added later. The monomers C are generally used in anhydrous form. Optionally, however, a small amount of water serving as a solubilizer for initiators, for example, and expecially for emulsifiers, may be dissolved or, if desired, emulsified in said monomers. Of course, this amount of water increases the water phase present at the termination of the process and reduces the resin content. In order that a high resin content may be obtained in the end product, the monomer phase fed in should contain at least 90 weight percent of the monomers C.

The first and second latices containing the synthetic resins A and B may be used in rather highly concentrated form, for example as 50 to 65 weight percent dispersions. Any structural viscosity which may develop with these solids contents will generally disappear promptly when the latices having different particle sizes are mixed. The resin content of the two latices should not be under 5 weight percent and preferably ranges from 20 to 65 weight percent.

The latices containing the resins A and B may be mixed before the feed of the monomers C begins. The second latex may also be added in whole or in part as the monomers C are being fed in. In that case, the latex having the smaller particle size is preferably used as the second latex.

In a preferred embodiment, the preparation of the first latex is combined with the process of the invention into a multi-step process. The first latex is prepared first in the usual manner. Either the same monomers as in C or other monomers may be used. To the latex being formed there is added the second latex containing the resin B, the monomers C then being added. In the simplest case, the monomers are fed under polymerization conditions into a previously introduced aqueous phase and, after a predetermined conversion has been reached, the previously prepared second latex is added and the monomer feed is resumed. As a rule it is preferable to interrupt the monomer feed while the second latex is being added. The distribution of the weight proportions of the resins A and B may be such that the ratio of the amount of the resin having the larger particles to the amount of the resin having the smaller particles ranges from 1:1 to 100:1, and preferably from 4:1 to 25:1. The total weight of A and B should make up not less than 5 weight percent and not more than 80 weight percent of the resin component of the end product, which is the total of the weights of A, B and C, assuming complete conversion.

The particle sizes of the resins A and B differ by a factor between 2 and 15. The smaller particles may have an average size ranging from 0.05 to 0.5 micron while the average diameter of the larger particles may range from 0.2 to 4 microns. The average particle size is the weight average of the particle diameters, as determined by the method of H. Lange, Kolloid-Zeitschrift, Zeitschrift fuer Polymere 223, 24 (1968), for example. A modern measuring method is based on measurement of the variations in scattered light due to Brownian movement of the latex particles in a laser beam. During the polymerization of the monomers C, the particles A and B continue to grow, the rate of growth generally being a function of surface area. Particles of different sizes therefore do not grow at the same rate. In the end product, the particles having the larger diameter account for the major portion of the weight of the dispersed plastic, preferably from 60 to 95 weight percent, while the small particles predominate numerically.

While the monomers C are being fed in and during the emulsion polymerization, the aqueous phase must contain an emulsifier, or optionally a mixture of several emulsifiers. These may be derived solely from the latices used. However, additional emulsifiers may be added before, during or after the polymerization of the monomers C. For example, an emulsifier may be dissolved in the monomers C, or an aqueous emulsifier solution may be dispersed therein. As a rule, no new particles should form during the emulsion polymerization. And none will form if the amount of emulsifier optionally added is such, and is metered in at such a rate, that there is no free emulsifier, that is to say, no emulsifier not adsorbed on the particle surface. The latices used may contain the anionic, cationic, or nonionic low molecular weight emulsifiers having a surfactant nature commonly used with resin dispersions, or compatible mixtures thereof, in the usual amounts. Of course, the emulsifier system of the first and second latices must be compatible with each other, which in case of doubt must be verified beforehand. In general, anionic emulsifiers are compatible with one another and with nonionic emulsifiers. The same is true of cationic emulsifiers, whereas anionic and cationic emulsifiers usually are incompatible with one another. Compatibility must be borne in mind also when additional emulsifiers are being added. The concentration of ionic emulsifiers in the end product preferably ranges from 0.01 to 2 weight percent, based on the water phase. When nonionic emulsifiers are desired in the end product for reasons of stability and these are not contained in the latices used, they are appropriately added along with the second latex. Moreover, bases or other additives which usually are added only on completion of the polymerization may be added at the same time. In this way, the agitation time that would be required if they were added subsequently is saved.

Emulsion polymerization is initiated by the usual water soluble free radical forming initiators, such as potassium or ammonium persulfate, or known redox systems. So far as the amounts and the temperature to be used are concerned, the rules known from emulsion polymerization apply. The monomers C may be added gradually under polymerization conditions on the basis of the conversion reached so that no large amounts of unreacted monomers accumulate. Uniform addition of the monomers over a period of from 0.5 to 5 hours with agitation is generally advisable. The heat of polymerization liberated may be removed through the wall of the vessel by cooling. However, more or less adiabatic operation is possible, especially when C represents but a small proportion of the total of A, B and C. On the other hand, the monomers C may also be added to the mixture of the latices of the plastics A and B all at once and emulsified, the polymerization being started then.

Often it will be more advantageous to add at first only a portion of the monomers C and to add further portions of the monomers C whenever the polymerization subsides. After the completion of polymerization, agitation is preferably continued for a few hours under polymerization conditions. This may be followed by the usual measures for the removal of monomer residues.

The directions given for the preparation of bimodal dispersions having two maxima in the particle-size distribution curve are applicable also to the preparation of dispersions with three or more maxima. For their preparation, a third latex or further latices may be added, or a bimodal dispersion may be used as the first and/or second latex. Every maximum must differ from the next one by a factor between 2 and 15 with respect to the average particle size.

The preparation of the starting latices for the process of the invention is described in following Examples 1 to 5. The process in accordance with the invention is illustrated in Examples 6 to 11.

The particle diameters given in the example are average values determined by a special laser nephelometric method with due regard to Brownian molecular movement. The method is described in a publication of Coulter Electronics, Ltd. (1979), on the Coulter Nano-Sizer apparatus. It gives just one average value for bimodal dispersions, and that value is not necessarily representative of the particles actually present.

EXAMPLE 1

A solution in 2100 g water of 6.3 g ammonium peroxydisulfate and 0.042 g of an emulsifier which is the product of the reaction of triisobutylphenol and 7 moles of ethylene oxide, which product had been sulfated and converted to the sodium salt, was charged to a 6-liter Witt jar equipped with reflux condenser, agitator, and feed vessel and heated to 80° C. A previously prepared monomer/emulsifier mixture of 526 g of methyl methacrylate, 439 g of butyl acrylate, 9.75 g of methacrylic acid, 2 g of water, and 2.1 g of the above emulsifier was added dropwise to this solution within 60 minutes at 80° C. A monomer/emulsifier mixture of 1579 g of methyl methacrylate, 1316 g of butyl acrylate, 29.25 g of methacrylic acid and 18.9 g of the above emulsifier, as well as 20 g of water, was then added over a period of 3 hours. A pH of 8 was then established with aqueous ammonia and the batch was held at 80° C. for 2 hours and then cooled to room temperature.

EXAMPLE 2

A solution in 786 g water of 0.6 g ammonium peroxydisulfate and 18 g of an emulsifier which is the product of the reaction of triisobutylphenol and 7 moles of ethylene oxide, which product had been sulfated and converted to the sodium salt, was charged to a 2-liter Witt jar equipped with reflux condenser, agitator, and feed vessel and heated to 80° C. A previously prepared emulsion of 432 g of methyl methacrylate, 360 g of butyl acrylate, 8 g of methacrylic acid, 1.8 g of the above initiator, and 450 g water was added to this solution over a period of 4 hours, with agitation.

The batch was then held at 80° C. for 2 hours and then cooled to 50° C. A pH of 8 was then established with aqueous ammonia and 42 g of a nonionic emulsifier which was the product of reaction of 1 mole isononylphenol and 50 moles ethylene oxide, dissolved in 80 g water, were added to the batch.

EXAMPLE 2a:

Prepared like Example 2, except that after cooling to 50° C. no ammonia and no nonionic emulsifier were added.

EXAMPLE 3

A solution of
0.4 g of ammonium peroxydisulfate,
0.042 g of an emulsifier formed by the reaction of triisobutylphenol and 7 moles ethylene oxide, followed by sulfation and conversion to the sodium salt, and
335 g of distilled water was charged to a polymerization vessel equipped as described in Example 2 and heated therein to 80° C.

To this charge there was added over a period of 4 hours, with agitation, an emulsion of
626 g of butyl acrylate,
526 g of methyl methacrylate,
8 g of methacrylic acid,
3 g of the above emulsifier,
1.3 g of ammonium persulfate, and
500 g of distilled water.
The batch was then held at 80° C. for 2 hours and then cooled to room temperature and filtered.

EXAMPLE 4

The procedure was the same as in Example 3, except that the amounts of the ingredients were as follows:
Initial charge:
0.6 g of ammonium peroxydisulfate,
1.2 g of an emulsifier which was the product of the reaction of triisobutylphenol and 7 moles ethylene oxide, which product had been sulfated and converted to the sodium salt, and
482 g of distilled water.
Feed: An emulsion of
432 g of butyl acrylate,
362 g of methyl methacrylate,
5.6 g of methacrylic acid,
1.8 g of ammonium persulfate,
0.12 g of the above emulsifier, and
725 g of distilled water.
The polymerization conditions were the same as in Example 3.

EXAMPLE 5

The procedure was the same as in Example 3, except that the following components were used.
Initial charge:
0.3 g of the sodium salt of a $C_{15}$ paraffin sulfonate,
0.1 g of ammonium peroxydisulfate, and
400 g of distilled water.
Feed: An emulsion prepared from
640 g of methyl methacrylate,
340 g of butyl methacrylate,
20 g of methacrylic acid,
5 g of the above emulsifier.
0.3 g of ammonium peroxydisulfate, and
600 g of distilled water.
The polymerization conditions were the same as in Example 3.

TABLE 1
Summary of starting latices of Examples 1 to 5

| Example | MMA | BA | MA | BMA | pH | Solids content (wt. %) | Average particle diameter (nm) |
|---|---|---|---|---|---|---|---|
| 1 | 54 | 45 | 1 | | 8.1 | 65.2 | 606 |
| 2 | 54 | 45 | 1 | | 9.6 | 39.9 | 54 |
| 2a | | | | | 2.1 | 39.8 | 58 |
| 3 | 45.3 | 54 | 0.7 | | 1.9 | 57.9 | 838 |
| 4 | 45.3 | 54 | 0.7 | | 1.9 | 39.6 | 104 |
| 5 | 64 | | 2 | 34 | 2.7 | 50.5 | 260 |

MMA = Methyl methacrylate
BA = Butyl acrylate
MA = Methacrylic acid
BMA = n-Butyl methacrylate

EXAMPLE 6

500 g of the latex prepared in Example 1, 81.3 g of the latex prepared in Example 2, and 32 g of a 35% solution of the reaction product of 1 mole of isononylphenol and 100 moles of ethylene oxide, along with 0.45 g of ammonium peroxydisulfate, were mixed and heated to 80° C. Over a period of 3 hours, a monomer mixture of 93.2 g of methyl methacrylate, 77.6 g of n-butyl acrylate, and 1.7 g of methacrylic acid was added. The batch was held at 80° C. for 2 hours, then cooled to room temperature and adjusted to pH 9.5 with ammonia solution.

EXAMPLE 7

470 g of the latex prepared in Example 3 and 44.6 g of the latex prepared in Example 4 were mixed. After the addition of 1.8 g of a 25% ammonia solution and 34.3 g of a 35% solution of the reaction product of 1 mole of isononylphenol and 100 moles of ethylene oxide, 0.49 g of ammonium peroxydisulfate was added at 80° C., and a mixture of 74.7 g of methyl methacrylate, 89.1 g of n-butyl acrylate, 1.19 g of methacrylic acid, 0.6 g of water and 0.6 g of an emulsifier which was the reaction product of triisobutylphenol and 7 moles of ethylene oxide, which product had been sulfated and converted to the sodium salt, was added dropwise within 1 hour. At the end of this addition, the batch was agitated at 80° C. for 2 hours and then cooled to room temperature.

EXAMPLE 8

A solution in 550 g of water of 1.8 g of ammonium peroxydisulfate and 0.012 g of an emulsifier which was the reaction product of triisobutylphenol and 7 moles of ethylene oxide, which product had been sulfated and converted to the sodium salt, was charged to a 2-liter Witt jar equipped with reflux condenser, agitator, and feed vessel and heated to 80° C. A previously prepared monomer/emulsifier mixture of 189 g of methyl methacrylate, 158 g of butyl acrylate, 3.5 g of methacrylic acid, 0.6 g of water, and 0.6 g of the above emulsifier was added dropwise to this solution within 1 hour at 80° C. (Addition 1.)

A monomer/emulsifier mixture of 283.5 g of methyl methacrylate, 236.5 g of n-butyl acrylate, 5.25 g of methacrylic acid, 3 g of water, and 2.7 g of the above emulsifier was then added within 1½ hours (Addition 2.) At this stage, the particle diameter was 560 nm.

After neutralization of the dispersion with NH₃ solution to pH 7 and addition of 30 g of a reaction product of 1 mole isononylphenol and 50 moles ethylene oxide (diluted with 70 g water) and 40 g of a finely divided 40% latex as prepared in Example 2, a mixture of 283.5 g of methyl methacrylate, 236.5 g of n-butyl acrylate, 5.25 g of methacrylic acid, 3 g of water, and 2.7 g of the above emulsifier was added within 1½ hours at 80° C. (Addition 3.) The batch was then held at 80° C. for 2 hours and then cooled to room temperature.

EXAMPLE 9

In a Witt jar equipped with reflux condenser, agitator, and feed vessel, a charge of
 6.3 g of ammonium persulfate and
 0.042 g of an emulsifier, formed as the reaction product of triisobutylphenol and 7 moles ethylene oxide, which product had been sulfated and converted to the sodium salt,
was heated in 1930 g of distilled water to 80° C. Over a period of 1 hour, a monomer/emulsifier mixture (Addition 1) composed of
 527 g of methyl methacrylate,
 439 g of n-butyl acrylate,
 10 g of methacrylic acid,
 2 g of the above emulsifier, and
 2 g of distilled water.

Over a period of 90 minutes, there was then added a monomer/emulsifier mixture (Addition 2) having a higher emulsifier content and composed as follows:
 790 g of methyl methacrylate,
 658 g of n-butyl acrylate,
 15 g of methacrylic acid,
 10 g of the above emulsifier, and
 10 g of distilled water.

On completion of Addition 2, 600 g of a latex prepared in accordance with Example 2a was fed in. This was followed by Addition 3, which was identical with Addition 2. Following Addition 3, 11 g of a 25% ammonia solution was added.

EXAMPLE 10

The procedure followed in Example 9 was repeated with the following changes.
Charge:
 2.1 g of initiator
 0.007 g of emulsifier
 654 g of distilled water
Addition 1 (over 30 minutes):
 104 g of methyl methacrylate
 55 g of n-butyl acrylate
 3.25 g of methacrylic acid
 0.07 g of emulsifier
 0.07 g of water
Addition 2 (over 2½ hours):
 520 g of methyl methacrylate
 276.4 g of n-butyl acrylate
 16.25 g of methacrylic acid
 3.75 g of emulsifier
 3.75 g of water
After the addition of 200 g of a latex prepared as in Example 5, the following monomer/emulsifier mixture was added over a period of 1 hour:
Addition 3
 208 g of methyl methacrylate
 110.6 g of n-butyl acrylate
 6.5 g of methacrylic acid
 1.5 g of emulsifier
 1.5 g of water

EXAMPLE 11

500 g of the latex prepared in Example 3 and 125 g of the latex prepared in Example 4 were mixed. A monomer/emulsifier mixture composed of 66.6 g of methyl methacrylate, 79.4 g of n-butyl acrylate, 1.03 g of methacrylic acid, 0.7 g water of, and 0.7 g of an emulsifier which was the reaction product of triisobutylphenol and 7 moles of ethylene oxide, which product had been sulfated and converted to the sodium salt, was then added within 5 minutes at room temperature with agitation.

The polymerization was initiated by the addition of 0.44 g of ammonium peroxydisulfate, 0.8 g of sodium bisulfite, and 0.003 g of ferrous sulfate. After a temperature peak had been reached, 2 g of a 25% $NH_3$ solution was added and the batch held at about 60° C. for 2 hours.

TABLE 2

Summary of the Properties of the Dispersions of Examples 6 to 11 Prepared in Accordance with the Invention

| | Latex I | | | Latex II | | | Quantity Ratio Latex I:II (solids) | Solids Content (wt. %) | APD* (nm) | Viscosity** | | | pH |
|---|---|---|---|---|---|---|---|---|---|---|---|---|---|
| Example | According to Example | Amount (g) | APD* (nm) | According to Example | Amount (g) | APD* (nm) | | | | mPa/sec | Sp/rpm | | |
| 6 | 1 | 500 | 606 | 2 | 81.3 | 54 | 10:1 | 69.5 | 760 | 9,400 | III | 6 | 9.5 |
| 7 | 3 | 470 | 838 | 4 | 44.6 | 104 | 15:1 | 65.6 | 732 | 1,800 | II | 6 | 5.5 |
| 8 | — | — | 560 | 2 | 40 | 54 | 55:1 | 69.4 | 864 | 12,600 | III | 6 | 6.8 |
| 9 | — | — | — | 2a | 600 | 58 | 10:1 | 64.3 | 568 | 112 | I | 30 | 8.7 |
| 10 | — | — | — | 5 | 200 | 260 | 10:1 | 65.0 | 614 | 118 | I | 30 | 1.9 |
| 11 | 3 | 500 | 838 | 4 | 125 | 104 | 5.8:1 | 63.0 | 324 | 72 | I | 60 | 9.2 |

*ADP = Average particle diameter, as determined by means of the Coulter Nano-Sizer.
**As determined by means of the Brookfield Viscosimeter. The viscosity value is followed by the spindle (Sp) number (Roman numeral) and the rotative speed (rpm).

What is claimed is:

1. A method for making an aqueous, highly concentrated, bimodal, synthetic resin dispersion, which method comprises adding, to a first aqueous dispersion of particles of a first synthetic resin, a second aqueous dispersion of particles of a second synthetic resin and a monomer phase comprising at least one free radically polymerizable unsaturated monomer, at least one such monomer being sparingly soluble in water, and then polymerizing said monomer phase in the presence of an emulsifier and of a water soluble free radical forming initiator, the average size of said particles of said first synthetic resin differing by a factor between 2 and 15 from the average size of said particles of said second synthetic resin, the total weight of said first and second synthetic resin and of said monomer representing 100 parts by weight and the total weight of water present as the aqueous phase of said bimodal resin dispersion representing not more than 70 parts by weight.

2. A method as in claim 1 wherein the weight of the particles present either in said first or in said second aqueous dispersions, whichever has the larger particles, is at least 60 percent of the total weight of said first and second synthetic resins.

3. A method as in claim 1 wherein said monomer phase additionally contains a water soluble emulsifier.

4. A method as in claim 3 wherein said monomer phase additionally contains a small amount of water.

5. A method as in claim 1 wherein the total weight of water present as the aqueous phase of said bimodal resin dispersion represents not more than 60 parts by weight.

6. A method as in claim 1 wherein the total weight of water present as the aqueous phase of said bimodal resin dispersion represents not more than 50 parts by weight.

7. A method as in claim 1 wherein said monomer phase, comprising at least 90 percent by weight of monomers, is gradually fed into said first aqueous dispersion under polymerizing conditions.

8. A method as in claim 1 wherein said monomers are added to a mixture of said first and second aqueous dispersions in one or more portions.

* * * * *